US010614065B2

(12) United States Patent
Ota et al.

(10) Patent No.: US 10,614,065 B2
(45) Date of Patent: Apr. 7, 2020

(54) CONTROLLING SEARCH EXECUTION TIME FOR VOICE INPUT FACILITY SEARCHING

(71) Applicant: TOYOTA MAPMASTER INCORPORATED, Nagoya-shi, Aichi (JP)

(72) Inventors: Yousuke Ota, Nagoya (JP); Satoshi Tagawa, Nagoya (JP)

(73) Assignee: TOYOTA MAPMASTER INCORPORATED (JP)

( * ) Notice: Subject to any disclaimer, the term of this patent is extended or adjusted under 35 U.S.C. 154(b) by 0 days.

(21) Appl. No.: 15/521,914

(22) PCT Filed: Oct. 26, 2016

(86) PCT No.: PCT/JP2016/081775

§ 371 (c)(1),
(2) Date: Apr. 26, 2017

(87) PCT Pub. No.: WO2018/078751

PCT Pub. Date: May 3, 2018

(65) Prior Publication Data

US 2019/0251088 A1 Aug. 15, 2019

(51) Int. Cl.
*G06F 16/00* (2019.01)
*G06F 16/2453* (2019.01)
(Continued)

(52) U.S. Cl.
CPC ........ *G06F 16/24539* (2019.01); *G06F 16/00* (2019.01); *G06F 16/24568* (2019.01);
(Continued)

(58) Field of Classification Search
CPC ..................... G06F 16/24568; G06F 16/24564
See application file for complete search history.

(56) References Cited

U.S. PATENT DOCUMENTS

2010/0121527 A1* 5/2010 Namba .................. G01C 21/36
701/36
2011/0123004 A1* 5/2011 Chang .................. G06F 16/433
379/88.01
2018/0137859 A1* 5/2018 Park ........................ G10L 15/22

FOREIGN PATENT DOCUMENTS

JP 2001134278 A 5/2001
JP 2007-034465 2/2007
(Continued)

OTHER PUBLICATIONS

Written Opinion; PCT/JP2016/081775; dated Oct. 26, 2016; 3 Pgs.

*Primary Examiner* — Thu Nguyet T Le
(74) *Attorney, Agent, or Firm* — Schmeiser, Olsen & Watts, LLP

(57) ABSTRACT

A facility searching method is provided, including preparing a facility DB storing facility information, converting a received voice data input constituting a voice query into data in a predetermined format, generating a query executable in a facility search based on the converted data, executing the facility search corresponding to the generated query by referencing the facility DB, controlling the facility search to execute a search at a preset search execution timing, and outputting a search result of a searched facility, further including: preparing a search query history DB for storing searched queries in association with a search execution time, specifying a zeroth query searched before the generated query by referencing the search query history DB, determining whether the generated query matches the zeroth query, setting the facility search to an execution waiting state when determining, and canceling the execution waiting state when a new voice query input is received.

12 Claims, 5 Drawing Sheets

(51) Int. Cl.

| | |
|---|---|
| ***G06F 16/2455*** | (2019.01) |
| ***G06F 16/61*** | (2019.01) |
| ***G06F 16/632*** | (2019.01) |
| ***G10L 15/02*** | (2006.01) |
| ***G10L 15/22*** | (2006.01) |
| ***G10L 15/26*** | (2006.01) |

(52) U.S. Cl.

CPC ............ *G06F 16/61* (2019.01); *G06F 16/632* (2019.01); *G10L 15/02* (2013.01); *G10L 15/22* (2013.01); *G10L 15/265* (2013.01); *G10L 2015/027* (2013.01); *G10L 2015/223* (2013.01)

(56) References Cited

FOREIGN PATENT DOCUMENTS

| | | | |
|---|---|---|---|
| JP | 2009080579 | A | 4/2009 |
| JP | 2016181018 | A | 10/2016 |
| WO | WO2008023470 | A1 | 2/2008 |

* cited by examiner

FACILITY DB
5
SEARCH RESULT OUTPUT UNIT
20
SEARCH QUERY HISTORY DB
3
FACILITY SEARCHING UNIT
19
1 FACILITY SEARCHING DEVICE
FIRST GENERATING UNIT
11
SPECIFYING UNIT
13
DETERMINING UNIT
15
SEARCH EXECUTION CONTROL UNIT
17
FORMAT CONVERTING UNIT
9
INPUT RECEIVING UNIT
7
A
A

SEARCH QUERY HISTORY TABLE

| SEARCH REQUEST DATE AND TIME | SEARCH QUERY |
|---|---|
| : | : |
| 2016-10-05 9:55 | FUKUOKA RAMEN |
| 2016-10-05 10:00 | HAKATA RAMEN |
| : | : |

FIG. 2A

FACILITY TABLE

| FACILITY ID | FACILITY NAME | FACILITY ADDRESS | FACILITY GENRE |
|---|---|---|---|
| 001 | HAKATA RAMEN NAGONO | X-XX, NAGOYA STATION SOUTH, NAKAMURA WARD, NAGOYA CITY | RAMEN |
| 002 | HAKATA RAMEN HOUTA | Y-YY, NAKASU, HAKATA WARD, FUKUOKA CITY | RAMEN |
| 003 | MENDOKORO GEKI NAKASU TEN | Z-ZZ, NAKASU, HAKATA WARD, FUKUOKA CITY | HAKATA RAMEN |
| : | : | : | : |

FIG. 2B

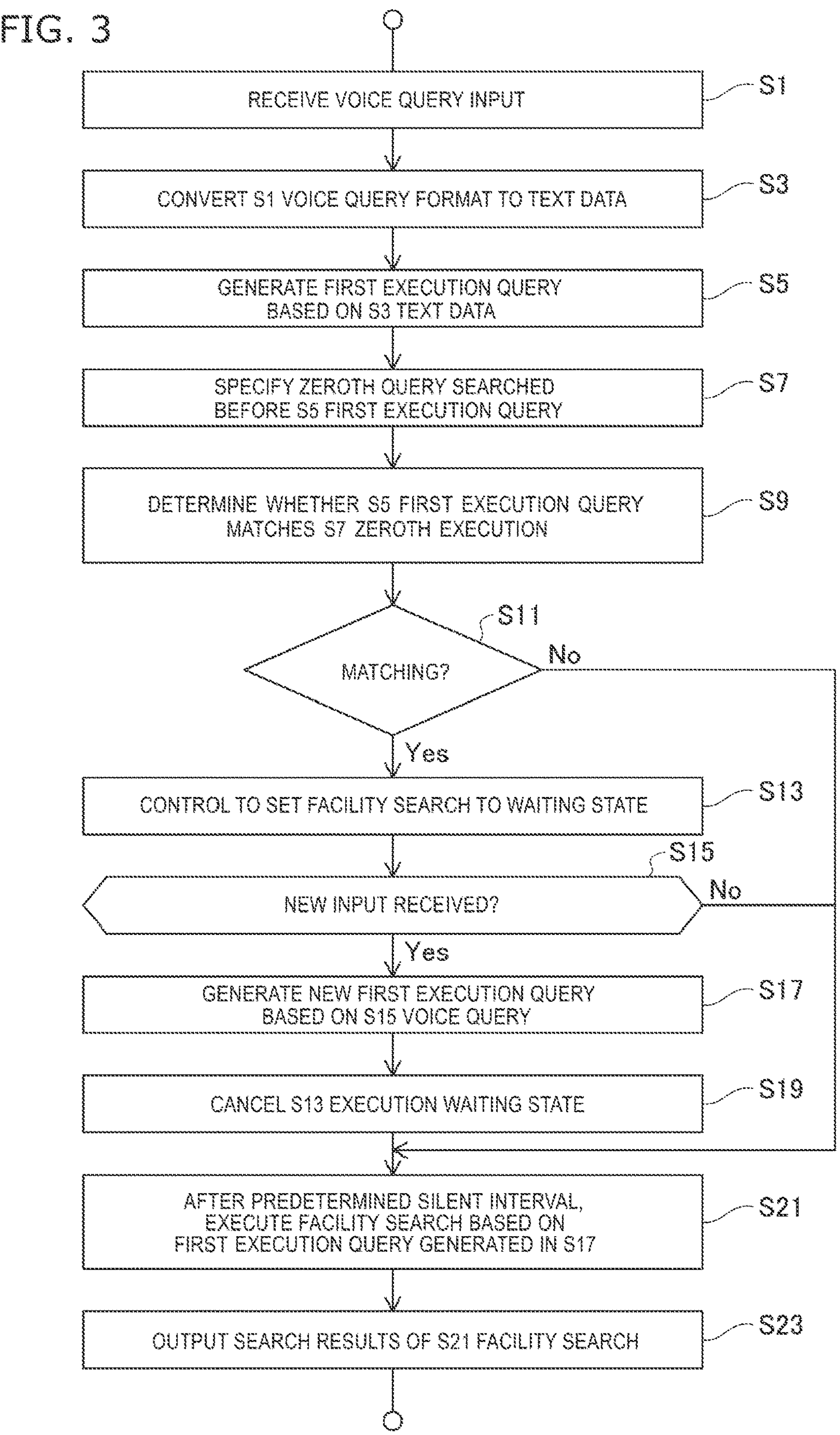
FIG. 3
RECEIVE VOICE QUERY INPUT
S1
CONVERT S1 VOICE QUERY FORMAT TO TEXT DATA
S3
GENERATE FIRST EXECUTION QUERY BASED ON S3 TEXT DATA
S5
SPECIFY ZEROTH QUERY SEARCHED BEFORE S5 FIRST EXECUTION QUERY
S7
DETERMINE WHETHER S5 FIRST EXECUTION QUERY MATCHES S7 ZEROTH EXECUTION
S9
MATCHING?
S11
No
Yes
CONTROL TO SET FACILITY SEARCH TO WAITING STATE
S13
NEW INPUT RECEIVED?
S15
No
Yes
GENERATE NEW FIRST EXECUTION QUERY BASED ON S15 VOICE QUERY
S17
CANCEL S13 EXECUTION WAITING STATE
S19
AFTER PREDETERMINED SILENT INTERVAL, EXECUTE FACILITY SEARCH BASED ON FIRST EXECUTION QUERY GENERATED IN S17
S21
OUTPUT SEARCH RESULTS OF S21 FACILITY SEARCH
S23

51 NAVIGATION DEVICE
CONTROL UNIT
510
SEARCH EXECUTION CONTROL UNIT
17
511
MEMORY UNIT
SEARCH QUERY HISTORY DB
3
512
INPUT UNIT
FACILITY DATABASE
5
513
OUTPUT UNIT
SEARCH RESULT OUTPUT UNIT
20
INPUT RECEIVING UNIT
7
FORMAT CONVERTING UNIT
9
514
INTERFACE UNIT
FIRST GENERATING UNIT
11
515
CURRENT POSITION SPECIFYING UNIT
IDENTIFYING UNIT
13
DETERMINING UNIT
15
FACILITY SEARCHING UNIT
19

CONTROLLING SEARCH EXECUTION TIME FOR VOICE INPUT FACILITY SEARCHING

CROSS-REFERENCE TO RELATED APPLICATIONS

This application claims priority to PCT Application No. PCT/JP2016/081775, having a filing date of Oct. 26, 2016, the entire contents of which are hereby incorporated by reference.

TECHNICAL FIELD

The following relates to a facility searching device, a facility searching method, a computer program, and a recording medium storing a computer program.

BACKGROUND

In recent years, with the spread of the Internet and mobile terminal devices, destination searching using a mobile terminal device such as a car navigation device or a smartphone is performed in daily life. This destination searching is generally performed by inputting a place name or a facility name of a destination. Then, in a general search system in a car navigation device, for a destination, for example, in a search query entered to search for facilities, a series of integral character strings constituting the search query is compared with a character string constituting a keyword such as a facility name stored in a search database such as a facility database, and a search for facilities corresponding to the search query is performed based on whether there is, for example, an exact match, a forward match, or a partial match.

Furthermore, in inputting search queries to searching devices, devices that can receive voice input such as by using a microphone are becoming common.

SUMMARY

An aspect relates to enabling improved search-user convenience in using voice input for facility searching with a car navigation device. As a result, the following was discovered.

When searching for "hakataramen," initially, a search query of "hakataramen" is input by voice and after conducting a facility search, there are cases in which, for example, it is desired to further narrow down the search results such as for "hakataramen" located in a specific area such as "nakasu." In such a case, "hakataramen" is re-input followed by a silent interval indicating delimitation before inputting "nakasu," but there are cases in which this silent interval is recognized as completion of the search query input and the search for "hakataramen" might be conducted again. However, when the re-input search query matches the original search query, the search user often has not completed the input of the search query and has the intention of entering an additional search query.

In view of this situation, in the case of performing facility searching by voice input, the present inventors have conceived to control so that, if a search query in progress matches a search query executed before the search query in progress, instead of the conventional control of executing a search after a predetermined silent interval elapses, search execution is set to a waiting state until a subsequent voice input is received, and the waiting state is cancelled when the subsequent voice input is received. By controlling search execution timing in this manner, it is possible to reflect the intention of the search user, who wishes to add a search query to narrow down the executed search results, thus enabling improvements in convenience for the search user.

In view of the above problems, a first aspect of the present invention is defined as follows. That is, a facility searching device including a facility database for storing information about facilities, an input receiving unit for receiving an input of a voice query, a format converting unit for converting voice data constituting a voice query received as the input into data in a predetermined format, a first generating unit for generating an execution query, which is executable in a following facility searching unit, based on the converted data, the facility searching unit for executing a search for facilities corresponding to the generated execution query by referencing the facility database, a search execution control unit for controlling the facility searching unit to execute a search at a preset search execution timing, and a search result output unit for outputting a searched facility, further comprising:

a search query history database for storing the searched execution query in association with a search execution time;

a specifying unit for specifying a zeroth execution query searched before a first execution query which is the generated execution query by referencing the search query history database; and a determining unit for performing a determination as to whether the first execution query matches the zeroth execution query;

wherein, the search execution control unit sets the search of the facility searching unit to an execution waiting state when the first execution query matches the zeroth execution query as a result of the determination, and cancels the execution waiting state when the input receiving unit receives an input of a new voice query.

According to such a facility searching device defined in the first aspect in which the input voice query is converted into data in the predetermined format before generating the execution query executable in the facility search, and the facility searching device executes the facility search at the preset search execution timing based on the generated execution query, the first execution query, which is the generated execution query, is compared with the zeroth execution query executed before the first execution query; in the case of both matching, the preset search execution timing is cancelled and the facility search to be executed is set to the execution waiting state; when an input of a new voice query is received, the execution waiting state is cancelled.

When the execution waiting state is cancelled, the facility search is executed with the preset search execution timing. In such a case of an execution query input in progress matching a previously searched execution query, the facility search is set to the execution waiting state until a next input of a voice query is received, so that in contrast with the conventional situation, execution of a search equivalent to a previously executed search is avoided, thus enabling improvements in search user convenience.

The predetermined format may be a text format (a second aspect). Because most of the data stored in the facility database and the search query history database are stored in a text format, converting the voice query into the text format to enable comparison between these data is preferable.

The first generating unit may generate a plurality of the execution queries in consideration of speech recognition fluctuation based on the converted data (a third aspect). The execution query considering speech recognition fluctuation may be generated in consideration of sound similarities such as the presence or absence of voiced consonants, plosives, and long vowels or similarity in vowel sounds, among others. Furthermore, in the case of the execution query being in English, speech recognition fluctuation character strings may be created based on similarity in pronunciation such as "r" and "l," "m" and "n," "s," "th," and "sh," "u" and "ar," and "ea" and "ee," among others. By generating an execution query in consideration of speech recognition fluctuation, it is possible to search for facilities more suited to the actual situation.

The determining unit may perform a determination as to whether the first execution query matches the zeroth execution query in units of syllables or words (a fourth aspect).

Here, syllable unit means a unit of sectioning based on vowels, and is, for example, sectioned in units of independent vowels and consonant/vowel combinations. Word unit means, for example, a unit of a word recognized by referencing a dictionary database in which each word is recorded.

A fifth aspect of the present invention is defined as follows. That is, a facility searching method including a first storing step of storing information in a facility database for storing information about facilities, an input receiving step of receiving an input of a voice query, a format converting step of converting voice data constituting a voice query received as the input into data in a predetermined format, a first generating step of generating an execution query, which is executable in a following facility searching step, based on the converted data, the facility searching step of executing a search for facilities corresponding to the generated execution query by referencing the facility database, a search execution control step of controlling execution of the search in the facility searching step at a preset search execution timing, and a search result output step of outputting a searched facility, further comprising:

a second storing step of storing the searched execution query in association with a search execution time in a search query history database;

a specifying step of specifying a zeroth execution query searched before a first execution query which is the generated execution query by referencing the search query history database with a specifying unit; and a determining step of performing a determination as to whether the first execution query matches the zeroth execution query with a determining unit;

wherein, the search execution control step comprises setting the search of the facility searching step into an execution waiting state when the first execution query matches the zeroth execution query as a result of the determination, and cancelling the execution waiting state when the input receiving step receives an input of a new voice query.

The effect of the fifth aspect of the present invention as so defined is equivalent with that of the first aspect.

A sixth aspect of the present invention is defined as follows. That is, in the method of the fifth aspect, the predetermined format is a text format.

The effect of the sixth aspect of the present invention as so defined is equivalent with that of the second aspect.

A seventh aspect of the present invention is defined as follows. That is, in the method defined in the fifth or sixth aspect, the first generating step comprises generating a plurality of the execution queries in consideration of speech recognition fluctuation based on the converted data.

The effect of the seventh aspect of the present invention as so defined is equivalent with that of the third aspect.

An eighth aspect of the present invention is defined as follows. That is, in the method defined in the fifth to seventh aspects, the determining step comprises performing a determination as to whether the first execution query matches the zeroth execution query in units of syllables or words.

The effect of the eight aspect of the present invention as so defined is equivalent with that of the fourth aspect.

Furthermore, a ninth aspect of the present invention is defined as follows. That is, a computer program configured to cause a computer to function as first storing means for storing information about facilities in a facility database, input receiving means for receiving an input of a voice query, format converting means for converting voice data constituting a voice query received by the input receiving means into a predetermined format, first generating means for generating an execution query, which is executable by a following facility searching means, based on the converted data, the facility searching means for executing a search corresponding to the generated execution query by referencing the facility database, search execution control means for controlling the facility searching means to execute a search at a preset search execution timing, and search result output means for outputting a searched facility;

the computer program further configured to cause the computer to function as:

second storing means for storing the searched execution query in association with a search execution time in a search query history database;

specifying means for specifying a zeroth execution query searched before a first execution query which is the generated execution query by referencing the search query history database; and determining means for performing a determination as to whether the first execution query matches the zeroth execution query;

wherein, the search execution controlling means sets the search of the facility searching means to an execution waiting state when the first execution query matches the zeroth execution query as a result of determination, and cancels the execution waiting state when an input of a new voice query is received by the input receiving means.

The effect of the ninth aspect of the present invention as so defined is equivalent with that of the first aspect.

A tenth aspect of the present invention is defined as follows. That is, in the computer program defined in the ninth aspect, the predetermined format is a text format. The effect of the tenth aspect of the present invention as so defined is equivalent with that of the second aspect.

An eleventh aspect of the present invention is defined as follows. That is, in the computer program defined in the ninth or tenth aspect, the first generating means generates a plurality of the execution queries in consideration of speech recognition fluctuation based on the converted data.

The effect of the eleventh aspect of the present invention as so defined is equivalent with that of the third aspect.

A twelfth aspect of the present invention is defined as follows. That is, in the computer program defined in the ninth to eleventh aspect, the determining means performs a determination as to whether the first execution query matches the zeroth execution query in units of syllables or words.

The effect of the twelfth aspect of the present invention as so defined is equivalent with that of the fourth aspect.

A thirteenth aspect of the present invention is defined as a recording medium on which the computer program according to any one of the ninth to twelfth aspects is recorded.

BRIEF DESCRIPTION

Some of the embodiments will be described in detail, with reference to the following figures, wherein like designations denote like members, wherein:

FIG. 2A is an explanatory diagram illustrating one example of a search query history table stored in a search query history database and an explanatory diagram illustrating one example of a search table stored in a facility database, in accordance with embodiments of the present invention.

FIG. 2B is an explanatory diagram illustrating one example of a search table stored in a facility database, in accordance with embodiments of the present invention.

FIG. 3 is a flowchart illustrating one example of an operation of a facility searching device, in accordance with embodiments of the present invention.

DETAILED DESCRIPTION

A facility searching device according to an embodiment of the present invention will now be described.

Figure 1:
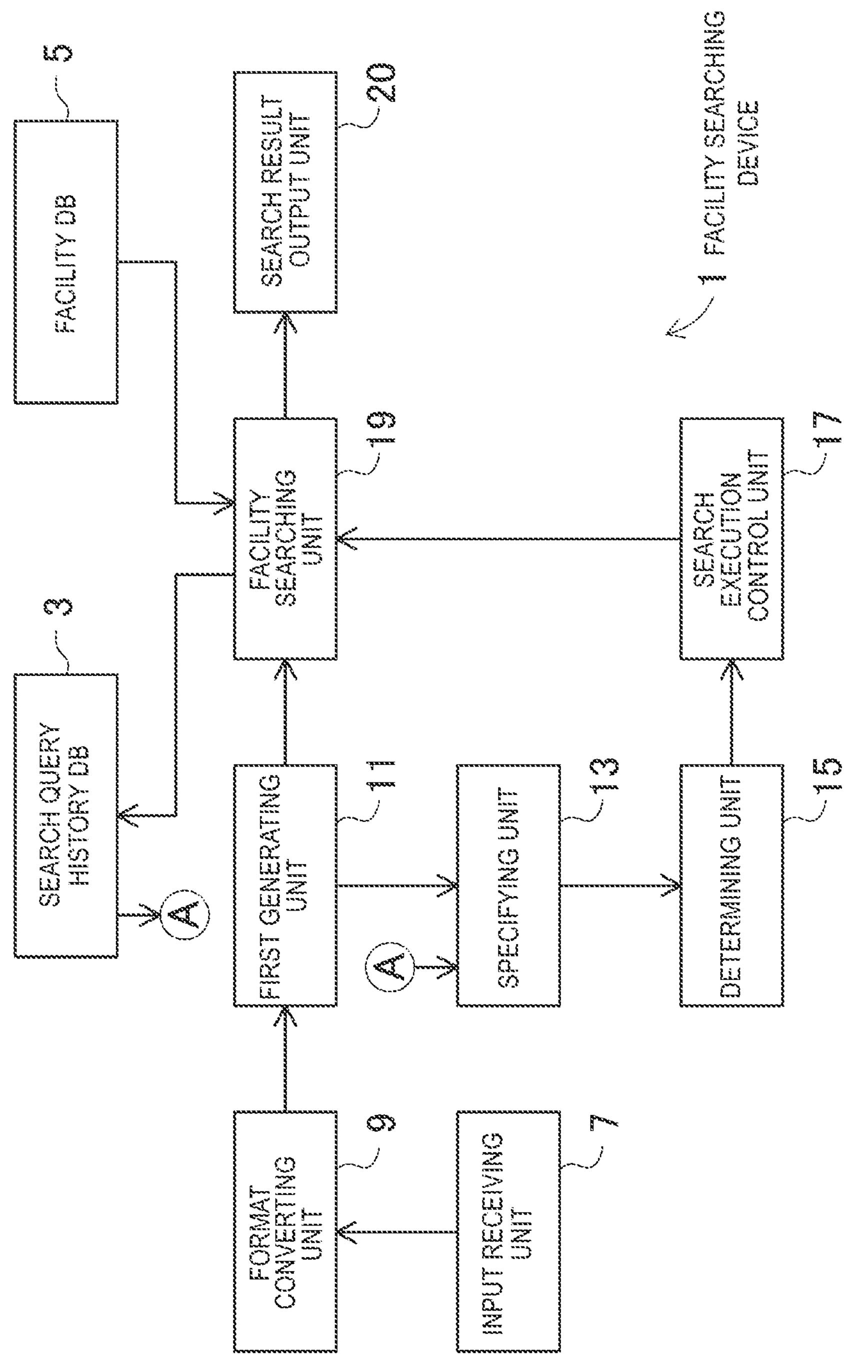
FIG. 1 is a block diagram illustrating a configuration of a facility searching device, in accordance with embodiments of the present invention.

FIG. 1 is a schematic diagram illustrating the facility searching device 1. Tables of FIG. 2 are used for explanation as appropriate hereinbelow.

As illustrated in FIG. 1, the facility searching device 1 includes a search query history database 3, a facility database 5, an input receiving unit 7, a format converting unit 9, a first generating unit 11, a specifying unit 13, a determining unit 15, a search execution control unit 17, a facility searching unit 19, and a search result output unit 20.

In the following example, the search user executes a facility search (zeroth search) on an execution query "hakataramen" for hakataramen stores and then attempts another search (first search) to narrow down the obtained search results to hakataramen restaurants located in nakasu.

In the search query history database 3, an execution query searched by the facility searching unit 19 to be described below is stored in association with a search execution date and time. In the search query history database 3, for example, a search query history table is stored. An example of a data structure of the search query history table is shown in FIG. 2A. As shown in FIG. 2A, the search query history table has, for example, a search execution date and time column, and an execution query column. The date and time at which the search was executed is stored in the search execution date and time column. In the execution query column, execution queries corresponding to the search execution are stored. In this example, for the zeroth search already executed, the execution query "hakataramen" is stored in association with the search execution date and time of 2016-10-5 10:00. In addition, as a result of the zeroth search, the facilities "hakata ramen nagono," "hakata ramen houta," and "mendokoro geki nakasu" in a facility table shown in FIG. 2B are retrieved.

Information on facilities is stored in the facility database 5. In the facility database 5, for example, a facility table is stored. An example of the data structure of the facility table is shown in FIG. 2B. As shown in FIG. 2B, the facility table has, for example, a facility ID column, a facility name column, a facility address column, and a facility genre column. In the facility ID column, identification information for uniquely identifying a facility is stored. In the facility name column, names of facilities such as those of amusement parks, theme parks, restaurants, hospitals, stations, and scenic spots, among others, are stored. In the facility address column, the address of the facility is stored. In the facility genre column, genres such as amusement park, theme park, restaurant, hospital, station, and scenic spot to which facilities belong are stored. The facility genre is not limited to being an upper-level genre such as restaurant but may also be a mid-level or lower-level genre. For example, upper-level genres such as "restaurant" can contain mid-level genres such as "beef bowl restaurant," "ramen restaurant," and "cafe" and these mid-level genres such as "ramen restaurant" can contain lower-level genres such as "hakata ramen," "taiwan ramen," and "tsukemen." As other information stored in the facility table, information expressing each information in katakana or in alphabet is preferably associated to facilitate comparison with the execution query generated by the first generating unit 11.

The input receiving unit 7 receives an input of a voice query by the user. The voice query is voice data constituting, for example, words or phrases that the user inputs by voice when searching, and is also voice data constituting requests and inquiries for search databases such as search conditions. The voice data can be received, for example, by using an input unit such as a microphone provided in a navigation device provided with the facility searching device 1. For example, a voice input such as "ha," "ka," "ta," "ra," "me," and "n" is received in order as a voice query.

The format converting unit 9 converts the voice data constituting the voice query received by the input receiving unit 7 into data in a predetermined format. Examples of data in the predetermined format include digital data such as text data. Examples of the text data include hiragana, katakana, alphabet, numbers, and symbols, among others, which can be used individually or in a combination of two or more. The format converting unit 9 converts voice data into text data by voice processing such as A/D conversion (analog-to-digital conversion). In this example, for example, "ha" of the voice query is converted into text data "ha." The input receiving unit 7 also converts the received input following "ha" of the voice query, that is, "ka," "ta," "ra," "me," and "n" into text data such as "ka," "ta," "ra," "me," and "n" (for example, in katakana).

The first generating unit 11 generates an execution query executable by the facility searching unit 19 based on the data converted by the format converting unit 9. For example, the first generating unit 11 can simply concatenate the text data "ha," "ka," "ta," "ra," "me," and "n" converted by the format converting unit 9 to generate an execution query "hakataramen." As another example, according to need, it is also possible to convert the concatenated text data to kanji (Chinese characters) together with hiragana to generate, for example, "HAKATAramen" as an execution query. The execution query may also be generated by decomposing the concatenated text into constituent words comprising decomposed morphemes and combining the constituent words with a space, character, or symbol representing a delimiter between the constituent words. For example, by decomposing "hakataramen" or "HAKATAramen" by a morphological analysis method, among other methods, and adding a space between the constituent words "hakata" and "ramen" as decomposed morphemes, it is possible to generate an execution query representable as "hakata [space] ramen." Examples of delimiter symbols include commas, hyphens, underscores, slashes, semicolons, and plusses, among others. Herein, morpheme analysis means dividing a sentence into morphemes, which are the smallest meaningful unit of a language, followed by determining a part of speech for each morpheme by using a morpheme dictionary, for example, to which part-of-speech information is associated. When the input receiving unit 7 receives an input of a silent interval, a delimiter such as a space may be added to a portion corresponding to the silent interval as described above. For example, when a silent interval is included between "hakataramen" and "nakasu," an execution query "hakataramen [space] nakasu" can be generated.

The specifying unit 13 references the search query history database 3 to specify a zeroth execution query searched before a first execution query which is the execution query generated by the first generating unit 11. While the zeroth execution query is not particularly limited as long as the zeroth execution query is searched before the first execution query, for example, it is possible to specify the query as the execution query "hakataramen" searched immediately before the first execution query. As another example, any of the execution queries in the same search session as the first execution query can be identified as the zeroth execution query. An example of the zeroth execution query which is in the same search session as the first execution query is an execution query being any of the execution queries searched within a predetermined time preceding the search time of the first execution query. Also, searches performed in the period from turning on to turning off the ignition of a vehicle may be considered to be in the same session. In this example, the specifying unit 13 can specify the execution query "hakataramen" having a search date and time of 2016-10-5 10:00 searched immediately before the first execution query "hakataramen" generated by the first generating unit 11 as the zeroth execution query.

The determining unit 15 determines whether the first execution query generated by the first generating unit 11 matches the zeroth execution query specified by the specifying unit 13. For example, the determining unit 15 compares the text data of the first execution query with the text data of the zeroth execution query, and if there is a perfect match, can determine that they "match." As another example, with respect to the zeroth execution query, speech recognition fluctuation terms considering fluctuations in speech recognition are created and when a match is made with one of the text data of the created speech recognition fluctuation terms, the first execution query and the zeroth execution query may be determined to "match." In this example, since the first execution query "hakataramen" and the zeroth execution query "hakataramen" are perfectly matched, a determination result indicating "match" is sent to a search execution control unit 17 described below.

The search execution control unit 17 controls the search execution timing of the facility searching unit 19, which will be described below, based on the determination result of the determining unit 15. That is, the search execution control unit 17 controls to cancel a conventional first search execution timing and switch to a second search execution timing of the present invention. In particular, when the determining unit 15 determines that the first execution query and the zeroth execution query do not match each other, as in conventional controls, the search execution control unit 17 controls so that the search by the facility searching unit 19 is executed at a preset search execution timing as the first search execution timing. An example of a conventional control is a search execution timing in which, after the input receiving unit 7 receives the input of the last sound data ("n" in the example above) and a predetermined silent interval (such as one second) is received, a search is executed. In contrast, when the determining unit 15 determines that the first execution query matches the zeroth execution query, the search execution control unit 17 controls the search execution timing (second search execution timing) so as to set the search of the facility searching unit 19 to an execution waiting state and cancel the execution waiting state when the input receiving unit 7 receives new voice query input. Thus, the search execution control unit 17 controls to set execution of the search to a waiting state without counting the predetermined silent interval after the input receiving unit 7 receives the last voice data input (for example, the "n" in "hakataramen") and to cancel the execution waiting state when the input receiving unit 7 receives an input of a new voice query (for example, "na" in "nakasu") so that a search is executed when a predetermined silent interval has elapsed after receiving the last voice input (for example, "su" in "nakasu") of the new voice query.

In this example, in the case of the input receiving unit 7 receiving an input of a new voice query "nakasu" which the format converting unit 9 converts into text data "nakasu," and the first generating unit 11 generates "hakataramen [space] nakasu" with the added text data "nakasu," as the first execution query. Then, because there is no zeroth execution query matching the first execution query "hakataramen [space] nakasu," in the search query history database 3, the search execution control unit 17 controls so that the facility searching unit 19 executes the search with the first search execution timing, that is, after the input receiving unit 7 receives an input of a predetermined silent interval, the facility searching unit 19 executes a search. Specifically, control is provided so that the search is executed when the silent interval elapses after receiving the input of the last "su" of the new voice query.

The facility searching unit 19 references the facility database 5 and executes a facility search corresponding to the first execution query generated by the first generating unit 11. The method of the search is not particularly limited, and facilities can be searched by a standard method. For example, by comparing the character strings constituting the execution query with the character strings constituting keywords such as facility name, facility address, and facility genre, among others, stored in the facility database, a facility corresponding to the execution query can be searched for by whether there is, for example, a perfect match, a forward match, or a partial match. In this example, the facility searching unit 19 can execute the facility search based on the first execution query finally generated by the first generating unit 11, for example "hakataramen [space] nakasu." In this example, in the facility table shown in FIG. 2 (B), facilities including "hakataramen" and "nakasu" are searched for by any of facility name, facility address, and facility genre. Specifically, examples of search results include a facility "HAKATAramenHOUTA" having "HAKATAramen(hakataramen)" in the facility name and "NAKASU(nakasu)" in the facility address and another facility "MENdokoroGEKI-NAKASUTEN" having "NAKASU(nakasu)" in the facility name and facility address as well as "HAKATAramen(hakataramen)" in the facility genre. In addition, a general score may be associated with facilities of the search result for determining an output ranking according to a standard method. For example, high general scores can be assigned to facilities according to degree of matching in a perfect match, a forward match, or a partial match, as well as according to the length of the matched character string.

The search result output unit 20 outputs facilities retrieved by the facility searching unit 19.

An example of an operation of the device 1 illustrated in FIG. 1 will be described with reference to FIG. 3.

First, in step 1, the input receiving unit 7 receives an input of a voice query "ha" by the user. Subsequently, inputs of the voice query "ka," "ta," "ra," "me," and "n" are received.

In step 3, the format converting unit 9 converts the voice data "ha" of the voice query received in step 1 into the text data "ha." Subsequently, the voice data "ka," "ta," "ra," "me," and "n" are converted into text data "ka," "ta," "ra," "me," and "n."

In step 5, the first generating unit 11 concatenates the text data "ha," "ka," "ta," "ra," "me," and "n" converted in step 3 to generate the first execution query "hakataramen."

In step 7, the specifying unit 13 references the search query history database 3 to specify the zeroth execution query "hakataramen" searched immediately before the first execution query "hakataramen" generated in step 5.

In step 9, the determining unit 15 performs a determination as to whether the first execution query "hakataramen" generated in step 5 matches the zeroth execution query "hakataramen" specified in step 7. When both match (step 11: Yes), the process proceeds to step 13.

In step 13, the search execution control unit 17 controls to cancel the normal search execution timing, and set the search of the facility searching unit 19 to the execution waiting state. Then, while in the execution waiting state and when receiving the input of a new voice query "nakasu" (step 15: Yes), the first generating unit 11 generates a new first execution query "hakataramen [space] nakasu" (step 17) based on the voice query of step 15, and the search execution control unit 17 cancels the execution waiting state of step 13 (step 19).

In step 21, after the input receiving unit 7 receives an input of the predetermined silent interval, the facility searching unit 19 executes a facility search based on the first execution query. As the first execution query used in step 21, in the case of a new first execution query being generated in step 17, the first execution query generated in step 17 is used, and in the case of a new first execution query being not generated in step 17 (step 11: No or step 15: No), the first execution query generated in step 5 is used.

In step 23, the search result output unit 20 outputs the facility retrieved in step 21.

Figure 4:
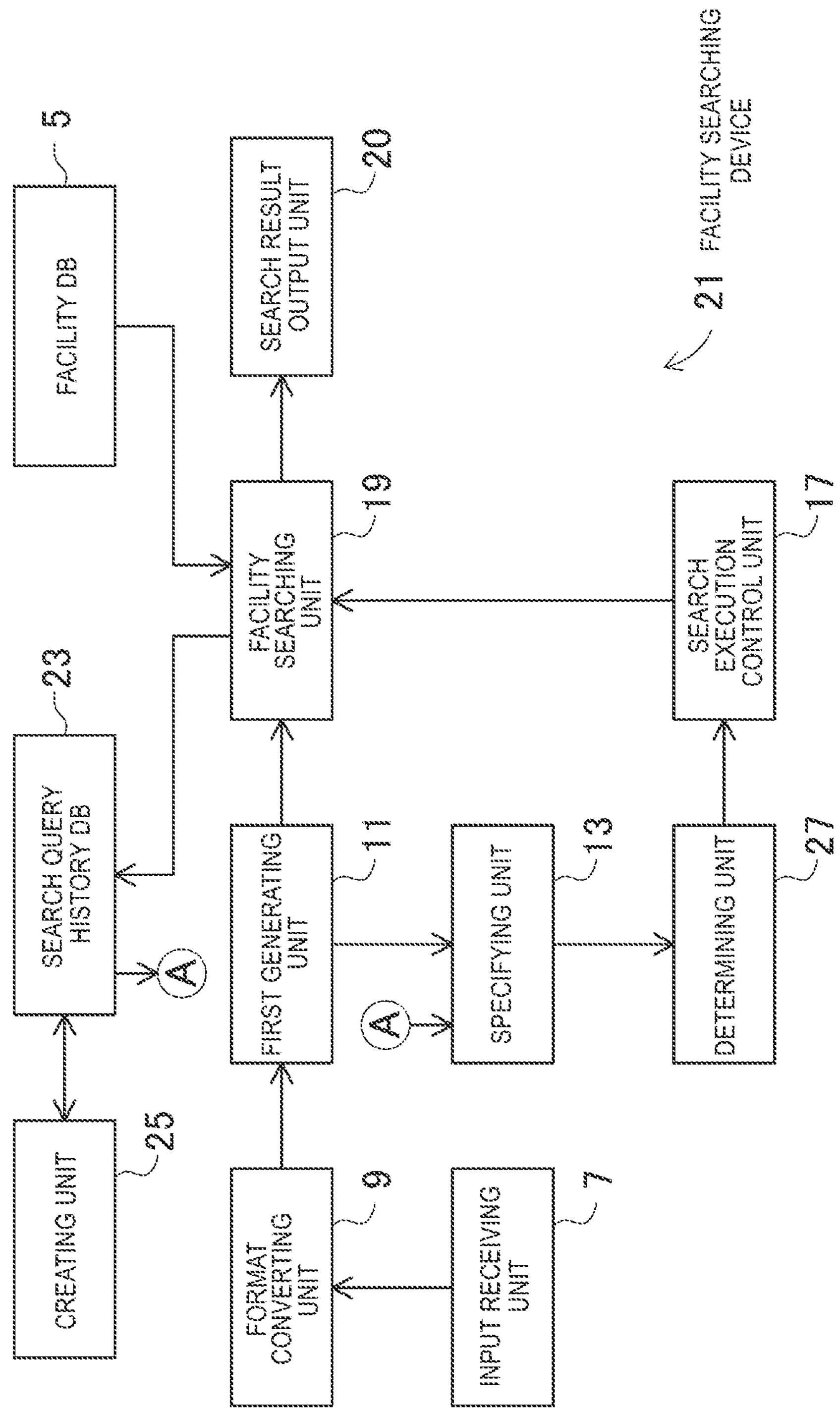
FIG. 4 is a block diagram illustrating a configuration of a facility searching device, in accordance with embodiments of the present invention.

FIG. 4 illustrates a facility searching device 21 according to another embodiment. In FIG. 4, the same elements as those in FIG. 1 are denoted by the same reference signs, and a description thereof will be partially omitted.

The facility searching device 21 illustrated in FIG. 4 can take speech recognition fluctuation into consideration for the zeroth execution query stored in the search query history database 3. Thus, with respect to the device 1 illustrated in FIG. 1, the device 21 further comprises a creating unit 25, and is provided with a search query history database 23 and a determining unit 27 instead of the search query history database 3 and the determining unit 15.

As in the search query history database 3, the search query history database 23 stores execution queries executed by the facility searching unit 19 and additionally stores speech recognition fluctuation character strings created by the creating unit 25 described below in association with the execution query.

The creating unit 25 references the search query history database 23 and creates speech recognition fluctuation character strings in consideration of speech recognition fluctuation of the zeroth execution query stored in the search query history database 23. The creation method is without particular limitation and creation may, for example, be based on the presence or absence of voiced consonants, plosives, long vowels, and similarity in vowel sounds, among others. For example, with respect to a zeroth execution query "hakataramen," speech recognition fluctuation character strings of "hagataramen," "hakatara'men," and "hakataraamen," among others, can be created. The created speech recognition fluctuation character strings are stored in the search query history database 23 in association with the zeroth execution query.

The determining unit 27 performs a determination as to whether the first execution query generated by the first generating unit 11 matches the zeroth execution query specified by the specifying unit 13 or any of the voice recognition fluctuation character strings associated with the zeroth execution query. This determination method can be performed by the same methods as in the determining unit 15. That is, a complete match between a zeroth execution query or a speech recognition fluctuation character string and the text data of the first execution query can be used to determine a "match" between the first execution query and the zeroth execution query. Specifically, for the zeroth execution query "hakataramen," when the first execution query is "hakataraamen," there is no exact match with the zeroth execution query "hakataramen"; however, because there is a perfect match with the voice recognition fluctuation character string "hakataraamen," the determining unit 27 determines a "match."

In this example, when the input receiving unit 7 subsequently receives the input of "nakasu," the first generating unit 11 can generate the first execution query "hakataraamen [space] nakasu."

As described above, in the case of having the data of the speech recognition fluctuation character strings, the facility searching unit 19 may execute the search in consideration of the speech recognition fluctuation character string associated with the execution query when referencing the facility database 5 to search for facilities. In this case, in addition to facilities having "hakataraamen" in the first execution query "hakataraamen [space] nakasu," in, for example, the facility name, facilities having "hakataramen," which is a speech recognition fluctuation character string for "hakataraamen," in, for example, the facility name are retrieved as well.

Figure 5:
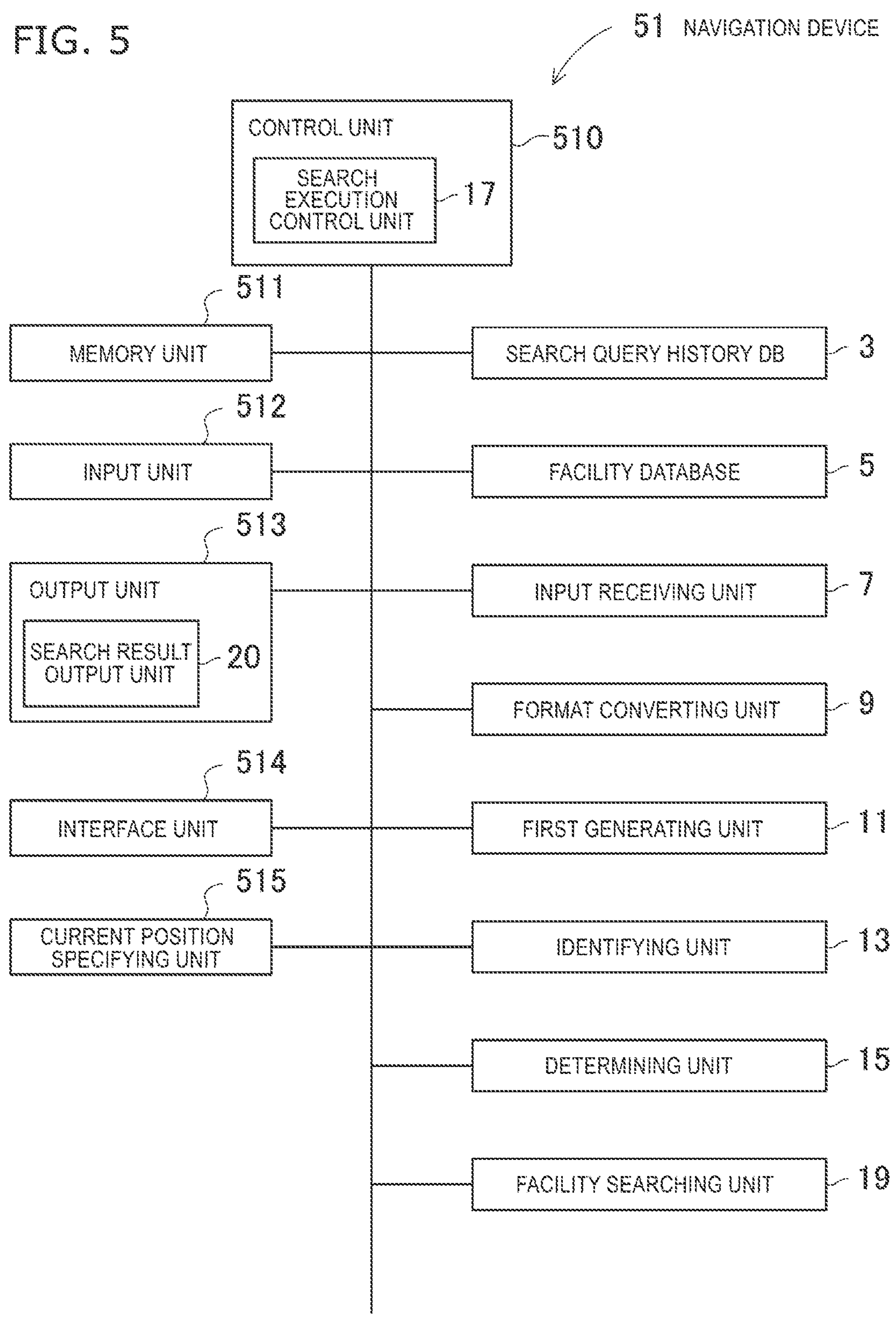
FIG. 5 is a block diagram illustrating a configuration of a navigation device, in accordance with embodiments of the present invention.

FIG. 5 shows a navigation device 51 of an example. In FIG. 5, the same elements as those in FIG. 1 are denoted by the same reference signs, and a description thereof will be partially omitted.

In addition to each element constituting the facility searching device 1 illustrated in FIG. 1, that is, the search query history database 3, the facility database 5, the input receiving unit 7, the format converting unit 9, the first generating unit 11, the specifying unit 13, the determining unit 15, the search execution control unit 17, the facility searching unit 19, and the search result output unit 20, a navigation device 51 further comprises a control unit 510, a memory unit 511, an input unit 512, an output unit 513, an interface unit 514, and a current position specifying unit 515.

The control unit 510 is a computer device including a CPU and a buffer memory, among other devices, and controls other elements constituting the navigation device 51. A computer program is stored in the memory unit 511, and this computer program is loaded into the control unit 510 which is a computer device to enable functioning thereof. The computer program can be stored to a memory device provided in the navigation device such as an internal hard disk or built-in memory or to a storage medium which can be replaced in the navigation device such as SD Card (registered trademark) memory, a memory card, a memory stick, smart media, CompactFlash (registered trademark), or a DVD, among other general-purpose mediums.

The input unit 512 is used, for example, when inputting user commands. In particular, a voice input device such as a microphone enabling voice input of an execution query can be used. Furthermore, examples of the input unit 512 which can be used for search result selection, among other purposes, include keyboards as well as pointing devices such as mouse input devices, light pens, and touch panels which interact with display contents.

The output unit 513 includes a display which displays an input screen, search results, and detailed facility information. In addition to the information output by the output unit 513, a search screen, a map, a position of a vehicle specified by the current position specifying unit, and a guide route which are output by general navigation devices are displayed. The output unit 513 includes a search result output unit 20. Functioning of the search result output unit 20 is as described above.

The interface unit 514 connects the navigation device 51 to, for example, a wireless network.

The current position specifying unit 515 specifies current position information of the navigation device 51 such as by using a GPS device or a gyroscope device. Furthermore, it is possible to specify the current time.

As another example, the case in which the input receiving unit 7 receives voice input in English in the facility searching device 1 of FIG. 1 will be described. In this example, the search user executes a facility search (zeroth search) for a pizza store "California Pizza Kitchen" and then attempts another search (first search) to further narrow down the obtained search results to "California Pizza Kitchen" located in San Diego. Thus, in the search query history database 3, an execution query "California [space] Pizza [space] Kitchen" is already recorded in association with a search execution date and time as a previously executed zeroth search.

The input receiving unit 7 receives an input of a voice query of "CaliforniaPizzaKitchen" as a voice query by the user.

The format converting unit 9 converts the voice query "CaliforniaPizzaKitchen" received by the input receiving unit 7 into text data. That is, the voice query is converted into text data representable as "CaliforniaPizzaKitchen."

Based on the text data "CaliforniaPizzaKitchen" converted by the format converting unit 9, the first generating unit 11 generates a first execution query that is executable as a search by the facility searching unit 19. In this case, by decomposing the text data "CaliforniaPizzaKitchen" into each constituent word "California," "Pizza," and "Kitchen" by referencing, for example, a word dictionary, inserting spaces between constituent words, and concatenating, "California [space] Pizza [space] Kitchen" is generated as the first execution query.

The specifying unit 13 references the search query history database 3 to specify "California [space] Pizza [space] Kitchen" as the zeroth execution query searched immediately before the first execution query "California [space] Pizza [space] Kitchen" generated by the first generating unit 11.

The determining unit 15 determines whether the first execution query "California [space] Pizza [space] Kitchen" generated by the first generating unit 11 matches the zeroth execution query "California [space] Pizza [space] Kitchen" specified by the specifying unit 13. In this example, because the first execution query "California [space] Pizza [space] Kitchen" matches the zeroth execution query "California [space] Pizza [space] Kitchen" in word order, it can be determined that they match.

Based on a determination of the determining unit 15 that the first execution query matches the zeroth execution query, the search execution control unit 17 cancels the conventional first search execution timing and switches to the second search execution timing. That is, the search execution control unit 17 switches to the second search execution timing which sets the search of the facility searching unit 19 to an execution waiting state and cancels the execution waiting state when the input receiving unit 7 receives input of a new voice query. Specifically, after receiving the input of the last sound of the voice query "CaliforniaPizzaKitchen," search execution is set to a waiting state without counting the predetermined silent interval. Thereafter, when the input receiving unit 7 receives the input of the first sound of a new voice query "SanDiego," the execution waiting state of the second search execution timing is cancelled. That is, upon receiving the input of the new voice query "SanDiego," when a predetermined silent interval elapses after receiving the input of the new voice query, execution of the search is switched to the first search execution timing.

In this example, the input of the new voice query "SanDiego," after being received, is converted by the format converting unit 9 into the text data "SanDiego"; the first generating unit 11 adds "SanDiego" to the previously generated "California [space] Pizza [space] Kitchen" and generates "California [space] Pizza [space] Kitchen [space] SanDiego" as the first execution query. Then, the determining unit 15 compares the zeroth search execution query "California [space] Pizza [space] Kitchen" previously specified by the specifying unit 13 with the first execution query "California [space] Pizza [space] Kitchen [space] SanDiego" newly generated by the first generating unit 11 and determines whether both match. While both respectively match in word order in the words "California," "Pizza," and "Kitchen," due to differing in one part, the word "SanDiego," they are determined to be non-matching. When the determining unit 15 determines a non-match, the search execution control unit 17 does not switch the search execution timing to the second search execution timing, and the facility searching unit 19 performs the facility search at the first search execution timing. Thus, the facility searching unit 19 receives the input of the last sound of the new voice query "SanDiego" and then executes the facility search after a predetermined silent interval has elapsed.

Furthermore, in the case of the zeroth execution query being in English as above, in addition to creating speech recognition fluctuation character strings based on similarity of sounds such as the absence or presence of voiced consonants, plosives, long vowels or similarity in vowel sounds, the creating unit 25 of the facility searching device 21 illustrated in FIG. 4 can create speech recognition fluctuation character strings based on similarity in pronunciation such as "r" and "l," "m" and "n," "s," "th," and "sh," "u" and "ar," and "ea" and "ee," among others. Examples include voice recognition fluctuation character strings such as "desert" for "dessert," "dinning" for "dining," and "site" and "cite" for "sight."

Although embodiments and examples of the present invention are described above, two or more embodiments (examples) may be combined to implement the present invention. Furthermore, one embodiment (example) may be partly implemented. Moreover, two or more of these embodiments (examples) may be combined partially to implement the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of “a” or “an” throughout this application does not exclude a plurality, and “comprising” does not exclude other steps or elements. The mention of a “unit” or a “module” does not preclude the use of more than one unit or module.

REFERENCE SIGNS LIST

1, 21 facility searching device
3, 23 search query history database (search query history DB)
5 facility database (facility DB)
7 input receiving unit
9 format converting unit
11 first generating unit
13 specifying unit
15, 27 determining unit
17 search execution control unit
19 facility searching unit
20 search result output unit
25 creating unit

The invention claimed is:

1. A computer system comprising:

a processor;

a memory device coupled to the processor; and a computer readable storage device coupled to the processor, wherein the storage device contains program code executable by the processor via the memory device to implement a method for searching a facility database, the method comprising:

receiving, by the processor, an input of a voice query;

converting, by the processor, voice data constituting the voice query received into data in a predetermined format;

generating, by the processor, an execution query based on the converted data, the execution query being a search for facilities corresponding to the generated execution query by referencing the facility database, wherein the search is executed at a preset search execution timing;

outputting, by the processor, a search result for a searched facility;

storing, by the processor, the searched execution query in association with a search execution time on a search query history database;

specifying, by the processor, the generated execution query in the search query history database as a zeroth execution query;

receiving, by the processor, a first execution query;

performing, by the processor, a determination as to whether the first execution query matches the zeroth execution query; and setting, by the processor, the search to an execution waiting state or an execution state as a result of the determining, wherein the execution waiting state being set when the first execution query matches the zeroth execution query as the result of the determining so that the search is not executed, and cancelling the execution waiting state when the input receiving unit receives an input of a new voice query, and executing the search based on the received new voice query, wherein the execution state being set when the first execution query does not match the zeroth execution query as the result of the determining so that the search is executed based on the first execution query.

2. The computer system according to claim 1, wherein the predetermined format is a text format.

3. The computer system according to claim 1, further comprising: generating, by the processor, a plurality of the execution queries in consideration of speech recognition fluctuation based on the converted data.

4. The computer system according to claim 1, wherein the performing the determination as to whether the first execution query matches the zeroth execution query is done in units of syllables or words.

5. A method for searching a facility database, the method comprising:

receiving, by a processor of a computing system, an input of a voice query;

converting, by the processor, voice data constituting the voice query received into data in a predetermined format;

generating, by the processor, an execution query based on the converted data, the execution query being a search for facilities corresponding to the generated execution query by referencing the facility database, wherein the search is executed at a preset search execution timing;

outputting, by the processor, a search result for a searched facility;

storing, by the processor, the searched execution query in association with a search execution time on a search query history database;

specifying, by the processor, the generated execution query in the search query history database as a zeroth execution query;

receiving, by the processor, a first execution query;

performing, by the processor, a determination as to whether the first execution query matches the zeroth execution query; and setting, by the processor, the search to an execution waiting state when the first execution query matches the zeroth execution query as a result of the determining, and cancelling the execution waiting state when the input receiving unit receives an input of a new voice query;

executing the search based on the first execution query and the new voice query if the first execution query matches the zeroth execution query, and executing the search based on the first execution query when the first execution query does not match the zeroth execution query.

6. The method according to claim 5, wherein the predetermined format is a text format.

7. The method according to claim 5, further comprising: generating, by the processor, a plurality of the execution queries in consideration of speech recognition fluctuation based on the converted data.

8. The method according to claim 5, wherein the performing the determination as to whether the first execution query matches the zeroth execution query is done in units of syllables or words.

9. A computer program product, comprising a computer readable hardware storage device storing a computer readable program code, the computer readable program code comprising an algorithm that when executed by a computer processor of a computing system implements a method for searching a facility database, the method comprising:

receiving, by the processor, an input of a voice query;

converting, by the processor, voice data constituting the voice query received into data in a predetermined format;

generating, by the processor, an execution query based on the converted data, the execution query being a search for facilities corresponding to the generated execution query by referencing the facility database, wherein the search is executed at a preset search execution timing;

outputting, by the processor, a search result for a searched facility;

storing, by the processor, the searched execution query in association with a search execution time on a search query history database;

specifying, by the processor, the generated execution query in the search query history database as a zeroth execution query;

receiving, by the processor, a first execution query;

performing, by the processor, a determination as to whether the first execution query matches the zeroth execution query; and setting, by the processor, the search to an execution waiting state when the first execution query matches the zeroth execution query as a result of the determining, and cancelling the execution waiting state when the input receiving unit receives an input of a new voice query;

executing the search based on the first execution query and the new voice query if the first execution query matches the zeroth execution query, and executing the search based on the first execution query when the first execution query does not match the zeroth execution query.

10. The computer program product according to claim 9, wherein the predetermined format is a text format.

11. The computer program product according to claim 9, further comprising: generating, by the processor, a plurality of the execution queries in consideration of speech recognition fluctuation based on the converted data.

12. The computer program product according to claim 9, wherein the performing the determination as to whether the first execution query matches the zeroth execution query is done in units of syllables or words.

* * * * *